Sept. 30, 1958 R. M. SPIEGEL 2,854,606
TEMPERATURE COMPENSATED CIRCUIT
Filed Dec. 6, 1955
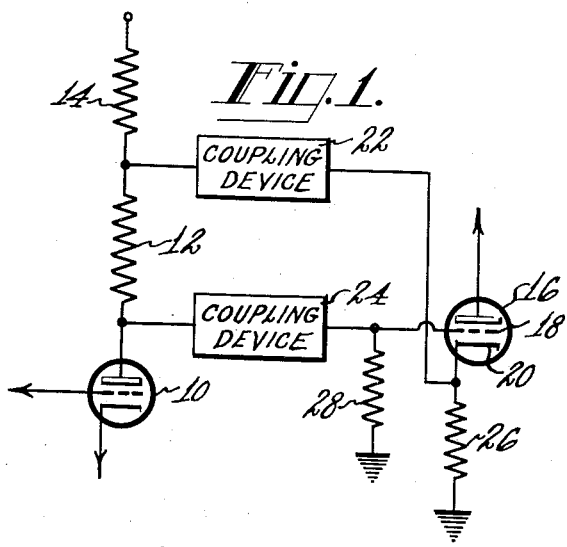
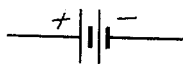
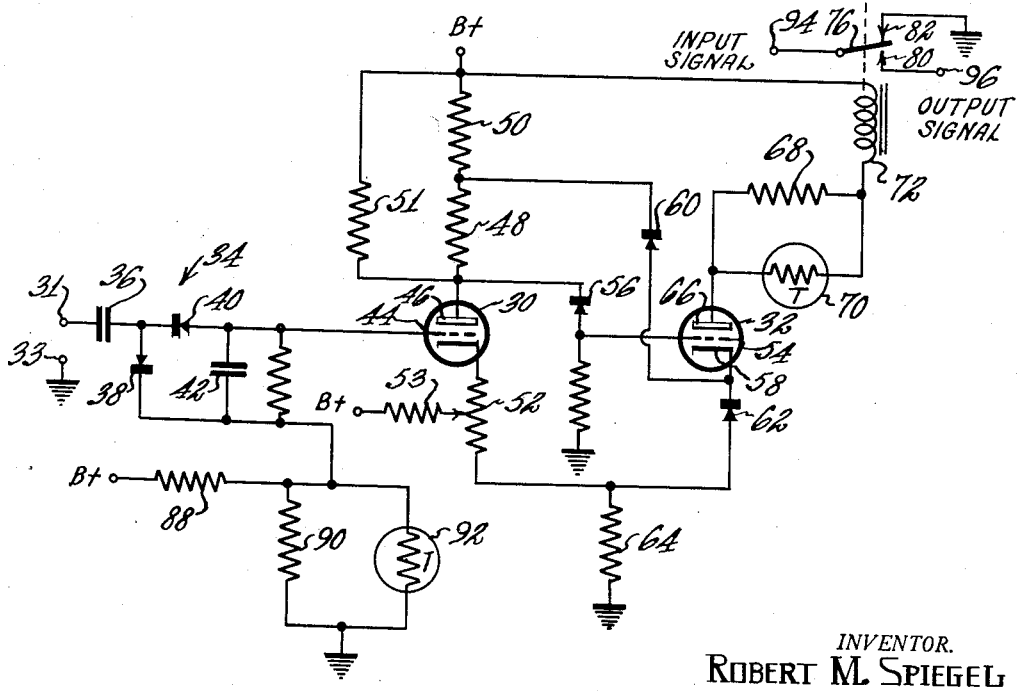
INVENTOR.
ROBERT M. SPIEGEL
BY Edward M. Farrell
ATTORNEY United States Patent Office 2,854,606
Patented Sept. 30, 1958

2,854,606

TEMPERATURE COMPENSATED CIRCUIT

Robert M. Spiegel, Philadelphia, Pa., assignor to Tele-Dynamics Inc., Philadelphia, Pa., a corporation of Pennsylvania Application December 6, 1955, Serial No. 551,390

5 Claims. (Cl. 317—149)

This invention relates to coupling circuits and, more particularly, to coupling circuits providing temperature compensation for elements included in such coupling circuits.

In many electrical systems, it is necessary that a linear relationship between input and output signals be maintained. Often, circuits must be operated under widely varying temperature environments. In direct current amplifier, waveforming and numerous other types of circuits, for example, signal currents often affect the characteristics of associated coupling elements by producing variations in temperature which change the values of the impedances of the coupling elements. Under these conditions distortion of electrical signals often results.

Heretofore temperature compensation for electrical circuits has been attained by serially connecting a pair of elements which have opposite temperature coefficients—one having negative temperature coefficient and the other having a positive temperature coefficient. In some types of bridge networks, temperature compensation for parallel elements within the bridge has been attained by utilizing elements having the same temperature coefficients to maintain proper balancing under varying temperature conditions. However, for many applications, temperature compensation circuits used heretofore have not always provided a simple and inexpensive means of compensation. Very often, a coupling network may involve unusual types of coupling elements which are normally not manufactured with opposite temperature coefficients.

Particular type of circuits where temperature compensation is highly desirable include carrier operated relay circuits. These circuits often must include a high degree of freedom from temperature drifts and often utilize numerous different types of coupling elements or devices.

Carrier operated relay circuits have been indirectly associated with the development of guided missiles and pilotless aircrafts and the like. So-called guidance receivers are often used to receive signals which actuate automatic devices to control various functions associated with a guided missile or aircraft. Such automatic devices generally include relays which become operative when carrier signals of predetermined amplitudes are applied to the receiver.

In the absence of a carrier signal or when the strength of the carrier signal is low, the output noise from a guidance receiver may be relatively high and may, in many cases, cause spurious responses within a system. Such spurious responses may affect the operation of a guided missile or pilotless aircraft in an undesired manner. Various interfering signals may also affect carrier operated relays to cause spurious operation of certain functions within the missile or aircraft. Variations in temperature may also affect elements within the system to cause spurious responses within a system.

It is an object of this invention to provide a novel temperature compensation circuit.

It is a further object of this invention to provide an improved coupling circuit wherein the coupling elements are temperature compensated.

It is still a further object of this invention to provide an improved temperature compensated carrier operated relay circuit.

In accordance with the present invention, a temperature compensated coupling network is provided. The coupling network includes an element for coupling one end of an impedance device to one end of an input circuit. A second element of the coupling network is used to couple the other end of the impedance device to the other end of the input circuit. Each of the coupling elements has substantially the same temperature coefficients.

Other objects and advantages of the present invention will be apparent and suggest themselves to those skilled in the art to which the invention pertains, from a reading of the following specification in association with the accompanying drawing, in which:

Figure 1 is a schematic representation, partly in block diagram form, of a temperature compensated coupling circuit, in accordance with the present invention;

Figures 1a, 1b and 1c represent examples of some types of coupling elements which may be embodied in the present invention, and Figure 3 is a schematic representation of a temperature compensated carrier operated relay circuit, in accordance with the present invention.

Referring particularly to Figure 1, an electron discharge device 10 includes a load resistor 12 and a voltage dropping resistor 14 in its output circuit. An output voltage developed across the resistor 12 is coupled to the input circuit of an electron discharge device 16, which includes a control grid 18 and a cathode 20. A coupling device 22 connects one end of the load resistor 12 to the cathode 20. A coupling device 24 connects the other end of the load resistor 12 to the control grid 18. A resistor 26 provides self-biasing means for the electron discharge device 16. The resistor 26 also provides means for limiting the current through the coupling device 22 to predetermined values. A grid leak resistor 28 is connected between the control grid 18 and a point of reference potential, designated as ground.

When an electrical signal is applied to the electron discharge device 10, it may be amplified and a corresponding voltage is developed across the resistor 12. A coupling network comprising two branches or arms include the coupling devices 22 and 24 which are used to couple the voltage developed across the resistor 12 to the input circuit of the electron discharge device 16. The temperature coefficients of the coupling devices 22 and 24 are designed to have substantially the same characteristics. Under these conditions, the voltage developed across the resistor 12, which is applied to the electron discharge device 16, is not materially affected by any variations in the characteristics of the coupling devices 22 and 24, resulting from changes in temperature.

The coupling network comprising the coupling devices 22 and 24 is especially useful in coupling direct current voltages from one circuit to another circuit. When a single element is used in a D. C. amplifier circuit, for example, temperature drifts of the coupling element often result in a distortion of the signal voltages; since the temperature drifts generally result in changes in the impedance value of the coupling element. The changes in impedance value result in a change of voltage drop across the coupling element. Numerous other circuits, such as waveforming circuits, must perform under conditions in which varying temperature affects the characteristics of a coupling element. In such circuits, it is often important that the coupled electrical signal remain substantially unaffected by varying temperature environmental conditions. The present invention provides a simple means for compensating for such varying temperature drifts in a coupling network.

When the coupling devices 22 and 24 have substantially the same temperature coefficients, the signal voltage applied to the control grid 18 and the cathode 20 will have substantially the same linear characteristics as the signal voltage developed across the resistor 12. This will be true regardless of temperature variations which change the impedance characteristics of the devices 22 and 24. The value of the resistors 26 and 28, as well as the differences in potentials at the anode of the electron discharge device 10 with respect to the point intermediate the resistors 12 and 14 should be considered in designing the coupling circuit if maximum temperature compensation is to be attained. The particular values of the coupling devices 22 and 24 may be the same or may be different dependent upon the particular circuit design. It is noted that the voltage at the anode of the device 10 differs from the voltage at the top of the resistor 12. If the voltage drop across the resistor 12 is substantially the same value as the voltage at the cathode 20, the voltages across each of the coupling devices 22 and 24 will be substantially the same.

The type of coupling devices employed will vary in many cases and be dependent upon the particular circuit requirements. Figures 1a, 1b and 1c illustrate a battery, a gaseous discharge device and a diode device respectively, which may be incorporated into a particular coupling network. However, a capacitive, inductive, resistive or other types of impedance devices may be incorporated into the coupling network. Regardless of the type of element or device employed, a pair of devices employed in the coupling network should have substantially the same temperature coefficients, i. e. an increase in temperature should decrease the value of the impedances of both devices and vice versa. It is apparent that the coupling network may include more than a single coupling device in each branch or arm of the coupling network. The principle involved in the circuit shown may be utilized with A. C. or D. C. circuits, although it is particularly applicable to D. C. coupling circuits, where variations in the temperature of the coupling elements may create serious problems.

Referring particularly to Figure 2, a carrier operated relay circuit includes a pair of electron discharge devices 30 and 32. An output voltage, which may be from an I. F. amplifier circuit of a guidance receiver and representative of input carrier signal, is applied from a pair of input terminals 31 and 33 to a form of voltage doubler circuit 34 through a coupling capacitor 36. The voltage doubler circuit comprises a pair of diodes 38 and 40 and capacitors 36 and 42. The output voltage from the voltage doubler circuit 34 is applied to the control grid 44.

The anode 46 is connected to a source of operating potential, designated as B+ through a load resistor 48, a voltage dropping resistor 50 and a resistor 51. A potentiometer 52 provides a threshold level control for the carrier operated relay circuit. An arm on the potentiometer 52 is connected to B+ through a resistor 53. The anode 46 which is at the same potential as the bottom end of the resistor 48, is connected to the control grid 54 of the electron discharge device 32 through a diode 56. The opposite end of the resistor 48 is connected to the cathode 58 of the electron discharge device 32 through a diode 60. A diode 62 provides self-biasing means for the device 32. A resistor 64 provides additional bias for the devices 30 and 32 as well as providing a form of coupling therebetween.

The anode 66 is connected to B+ through a resistor 68, a thermistor 70 and a winding 72 of a relay 74. The relay includes a pair of movable arms 76 and 78. The movable arm 76 is adapted to close either a contact 80 or 82 dependent upon its position. The movable arm 78 is adapted to close either the contact 84 or 86.

A temperature compensation network is provided by resistors 88, 90 and thermistor 92.

In considering the operation of this circuit, the relay 74 is maintained inoperative in the absence of a carrier signal or when the carrier signal is weaker than that necessary to overcome the threshold level to operate the relay. The electron discharge device 32 is biased by the diode 62 and the resistor 64 so that a small current ordinarily flows through the coil 72. Under these conditions, the movable contact arm 76 is grounded through the contact 82 and no receiver output voltage is applied from an input terminal 94 to an output terminal 96.

When a positive signal is applied to the control grid 54, the current through the coil 72 increases. When the current through the coil 72 increases to a predetermined value, the movable contact arms 76 and 78, engage contacts 80 and 84, respectively. It is seen that a signal from a receiver is connected to the output terminal 96 when the relay 74 becomes operative by a current through the winding 72. The terminal 96 may be connected to control various functions within a missile or aircraft. Likewise, the position of the movable contact arm 78 may be connected to control certain programming operations or other functions within a system involving a missile or aircraft.

In the present invention, the carrier operated relay 72 may be made operative by an automatic gain control voltage, by the voltage from an intermediate frequency stage, by the combination of the two voltages, or by any other suitable source of voltage which is representative of the carrier signal.

In carrier operated relays associated with guided missiles, spurious responses caused by temperature variations of elements within the circuit may result in the undesired operation or programming of certain functions within the missile.

The diodes 56 and 60, which comprise the coupling network between the electron discharge devices 30 and 32, have substantially the same temperature coefficients. The voltage applied to the device 32 will be substantially linear to the amplified signal voltage developed across the resistor 48. In designing and manufacturing a circuit such as illustrated, diode elements having similar temperature coefficients are relatively easy to obtain. Elements having opposite temperature coefficients, while in many cases permitting simpler circuit design, are not always readily available.

Additional temperature compensation is provided by the thermistor 92 when the D. C. level of the B+ source shifts.

The thermistor 70 provides temperature compensation for the resistance of the winding 72. The characteristics of thermistors in which resistance vary in accordance with temperature are known and therefore not described in detail.

The signal representative of the carrier signal may be applied to the network 34 where it is rectified and doubled. During the positive half of the alternating signal, the diode 38 is conductive causing electrons to flow into the right side of the capacitor 36 thereby making it negative. The diode 40 is substantially non-conductive during the positive half-cycle. During the negative half-cycle, the negative signal, as well as the charge accumulated on the capacitor 36, causes the diode 40 to conduct producing a change substantially double in amplitude to the peak applied signal. A double charge is accumulated across the capacitor 42. The doubled charge or voltage is applied to the control grid 44. It is seen that the network 34 may be considered as a half wave voltage doubler. The negative voltage resulting from the applied signal causes the current in the device 30 to decrease causing the voltage at the anode 46 to become more positive.

The positive signal from the anode 46 is applied to the control grid 54 causing the current in the device 32 to increase. The signal from the top of the resistor 48 is applied to the cathode 58.

When the current through the device 32 reaches a predetermined value, the current through the winding 72 causes the movable contact arms 76 and 78 to close the contacts 80 and 84, respectively. Closing of the contacts may be used to operate various circuits or to actuate devices for controlling various functions in a missile or receiver.

The novel coupling arrangement, together with the use of thermistors connected in appropriate places within the circuit, results in a carrier operated relay circuit which provides a high degree of freedom from the effects of temperature variations. The novel coupling arrangement has provided a simple and inexpensive means of providing temperature compensation in D. C. amplifiers, pulse forming circuits and other circuits wherein the coupling elements are subjected to undesired temperature drifts.

An exemplary set of values for the main various elements which have been used in practicing the present invention are as follows:

| | Ohms |
|---|---|
| Resistor 48 | 100,000 |
| Resistor 50 | 47,000 |
| Resistor 51 | 220,000 |
| Resistor 52 | 2,500 |
| Resistor 64 | 100 |

The diodes 56 and 60 may be of the commercial type Number 1N211.

The electron discharge triode vacuum tubes may be of the conventional types. Also, pentode or other types of tubes may be employed.

Other elements shown are not considered critical to the operation of the circuit illustrating the present invention and, consequently, are not given.

What is claimed is:

1. A temperature compensated circuit comprising a first vacuum tube device having an output circuit, an impedance device connected in said output circuit, a second vacuum tube device having an input circuit, said input circuit including the control grid and cathode of said second vacuum tube device, a first resistive element connected between said cathode and ground, a second resistive element connected between said control grid and ground, means for coupling a voltage developed across said impedance device to said control grid and said cathode, said means including two elements having substantially the same temperature coefficients of impedance, said elements being connected at opposite ends of said impedance device, one of said elements further being connected to said control grid of said second vacuum tube device, and the other of said elements further being connected to said cathode of said second vacuum tube device.

2. A temperature compensated circuit comprising a first vacuum tube device having an anode, means for connecting a source of operating potential to said anode, an impedance element connected between said means for connecting and said anode, a second vacuum tube device having an input circuit, said input circuit including a control grid and cathode of said second vacuum tube device, a first resistor connected between said cathode and ground, a second resistor connected between said control grid and ground, means for coupling a voltage developed across said impedance element to said input circuit, said last-named means including two diodes connected in the same direction having substantially the same temperature coefficients of impedance, one of said diodes being connected from said anode of said first vacuum tube device to said control grid of said second vacuum tube device, the other of said diodes being connected from a point intermediate said impedance element and said source of operating potential to said cathode of said second vacuum tube device.

3. In a carrier operated relay circuit, a relay including a coil responsive to current therethrough, means associated with said relay to be actuated when a carrier signal of a predetermined amplitude is applied to a receiver, a vacuum tube device having its anode serially connected with the coil of said relay, said vacuum tube including a cathode and a control grid, a first resistor connected between said cathode and ground, a second resistor connected between said control grid and ground, an amplifier, an impedance element associated with said amplifier, means for applying a signal voltage corresponding to said carrier signal from said receiver to said amplifier to produce a corresponding voltage across said impedance element, a coupling network for applying a signal voltage across said impedance element to said vacuum tube device to control the current through said vacuum tube device and the coil of said relay, said coupling network including a pair of coupling devices connected in the same direction having substantially the same temperature coefficients of impedance, and one of said coupling devices being connected from one side of said impedance element to said cathode of said vacuum tube device and the other of said coupling devices being connected from the other side of said impedance element to said control grid of said vacuum tube device.

4. In combination with a carrier operated relay including a coil, contact means associated with said relay actuated when a carrier signal of a predetermined amplitude is applied to a receiver, a vacuum tube device having its anode serially connected with said coil of said carrier operated relay, said vacuum tube device including a control grid and cathode, a first resistor connected between said cathode and ground, a second resistor connected between said control grid and ground, an amplifier circuit, means for applying a signal voltage from said receiver to said amplifier, an impedance element included in said amplifier circuit whereby the output voltage across said impedance element is determined by said signal voltage, a coupling network for applying the output voltage from said impedance element to said vacuum tube device to control the current therethrough, said coupling network including a pair of coupling devices having substantially the same temperature coefficients of impedance, and one of said coupling devices being connected from one side of said impedance element to said cathode of said vacuum tube device and the other of said coupling devices being connected from the other side of said impedance element to said control grid of said vacuum tube device.

5. In combination with a carrier operated relay having a coil, contact means adapted to be actuated when a carrier signal of a predetermined amplitude is applied to a receiver, a vacuum tube device having its anode serially connected with said coil of said carrier operated relay, said vacuum tube including a cathode and a control grid, a first resistor connected between said cathode and ground, a second resistor connected between said control grid and ground, an amplifier circuit, a voltage doubler rectifier circuit, an impedance element included in said amplifier circuit, means for applying said carrier signal to said voltage doubler rectifier circuit, means for applying an output voltage from said voltage doubler rectifier circuit to said amplifier circuit whereby the output voltage across said impedance element corresponds to said carrier signal, a coupling network for applying the output voltage from said impedance element to said vacuum tube device to control the current therethrough, said coupling network including a pair of coupling devices having substantially the same temperature coefficients of impedance, and one of said coupling devices being connected from one side of said impedance element to said control grid of said vacuum tube device and the other of said coupling devices being connected from the opposite side of said impedance element to said cathode whereby changes in operating characteristics of one of said coupling devices resulting from temperature changes is compensated by the other of said coupling devices thereby providing that the signal voltage applied to said vacuum tube device is substantially linear to the signal voltage developed across said impedance element.

References Cited in the file of this patent
UNITED STATES PATENTS

| | | |
|---|---|---|
| 2,583,021 | Smyth | Jan. 22, 1952 |
| 2,712,232 | Pfeiffer | July 5, 1955 |